(12) United States Patent
Jerbi et al.

(10) Patent No.: US 8,526,444 B2
(45) Date of Patent: Sep. 3, 2013

(54) METHOD FOR DISTRIBUTING DATA PACKETS IN A MOBILE NODE NETWORK AND ASSOCIATED NODE

(75) Inventors: Moez Jerbi, Issy les Moulineaux (FR); Sidi-Mohammed Senouci, Lannion (FR); Yacine Ghamri-Doudane, Clichy (FR)

(73) Assignee: France Telecom, Paris (FR)

( * ) Notice: Subject to any disclaimer, the term of this patent is extended or adjusted under 35 U.S.C. 154(b) by 524 days.

(21) Appl. No.: 12/743,328

(22) PCT Filed: Oct. 28, 2008

(86) PCT No.: PCT/FR2008/051941
§ 371 (c)(1),
(2), (4) Date: May 17, 2010

(87) PCT Pub. No.: WO2009/063151
PCT Pub. Date: May 22, 2009

(65) Prior Publication Data
US 2010/0254294 A1 Oct. 7, 2010

(30) Foreign Application Priority Data
Nov. 16, 2007 (FR) ..................... 07 59115

(51) Int. Cl.
*H04L 12/407* (2006.01)

(52) U.S. Cl.
USPC ........... 370/397; 370/315; 370/406; 370/399; 370/409; 455/11.1; 709/239; 709/240; 709/241; 709/242; 709/243; 709/244

(58) Field of Classification Search
USPC .............. 370/226, 237, 238, 238.1, 243, 246, 370/274, 279, 293, 310.2, 315, 327–339, 349, 397, 399, 406, 409, 492, 501; 455/8–10, 455/11.1, 12.1, 13.1, 13.2, 13.3, 13.4, 14–25, 455/422.1; 709/239–244
See application file for complete search history.

(56) References Cited

U.S. PATENT DOCUMENTS

| | | | |
|---|---|---|---|
| 5,802,061 A * | 9/1998 | Agarwal | 370/461 |
| 2005/0088318 A1* | 4/2005 | Liu et al. | 340/902 |
| 2005/0090242 A1* | 4/2005 | Kotzin et al. | 455/422.1 |
| 2005/0221759 A1 | 10/2005 | Spadafora et al. | |
| 2006/0235967 A1 | 10/2006 | Fritz | |
| 2007/0115868 A1 | 5/2007 | Chen et al. | |
| 2008/0002722 A1* | 1/2008 | Greene et al. | 370/400 |

(Continued)

OTHER PUBLICATIONS

Diane Barrett, "Computer Network Illustrated", Mar. 9, 2005, Jones and Bartlett Publishers, 1st Ed., p. 194-198.*

(Continued)

*Primary Examiner* — Hoon J Chung
(74) *Attorney, Agent, or Firm* — Knobbe Martens Olson & Bear LLP

(57) ABSTRACT

A method of broadcasting a data packet (D) in an ad hoc network comprising a plurality of groups of mobile nodes traveling along traffic lanes in a road network. The data packet (D) is broadcast within a group (G) during an intragroup broadcasting phase during which the data packet (D) propagates simultaneously in two opposing directions of movement ($A_1, A_2$), such that the packet (D) is received by peripheral nodes ($B_1, B_2$) of the group (G). During an intergroup broadcasting phase, a peripheral node (B) transmits the data packet (D) to another group.

9 Claims, 13 Drawing Sheets

(56) References Cited

U.S. PATENT DOCUMENTS

| | | | |
|---|---|---|---|
| 2009/0010268 A1* | 1/2009 | Giacomazzi et al. | 370/400 |
| 2009/0105942 A1* | 4/2009 | Lin et al. | 701/202 |
| 2010/0020774 A1* | 1/2010 | Mahajan et al. | 370/338 |
| 2010/0060480 A1* | 3/2010 | Bai et al. | 340/901 |

OTHER PUBLICATIONS

Kim et al., A Priority Forwarding Technique for Efficient and Fast Flooding in Wireless Ad Hoc Networks, 2005, Computer Communications and Networks, 2005, ICCCN 2005, 6 pages.*

Little, et al. An information propagation scheme for VANETs. *Proceedings of the 8th International IEEE Conference on Intelligent Transportation Systems*, Vienna, Austria, Sep. 13-16, 2005, pp. 155-160.

Lochert, et al. A routing strategy for vehicular ad hoc networks in city environments. *IEEE Proceedings, Intelligent Vehicles Symposium*, Jun. 9-11, 2003, pp. 156-161.

Tanenbaum, A. S. (Ed.). (2003). The medium access control sublayer. *Computer Networks*, 4th Ed. (p. 296). Upper Saddle River, NJ: Pearson Education.

* cited by examiner

METHOD FOR DISTRIBUTING DATA PACKETS IN A MOBILE NODE NETWORK AND ASSOCIATED NODE

RELATED APPLICATIONS

This is a U.S. National Phase Application under 35 USC §371 of International Application PCT/FR2008/051941, filed on Oct. 28, 2008.

This application claims the priority of French application no. 07/59115 filed on Nov. 16, 2007, and the content of which is hereby incorporated by reference.

BACKGROUND OF THE INVENTION

The invention lies in the field of wireless communications networks and is more particularly concerned with broadcasting data in an ad hoc network.

The invention applies especially but not exclusively to vehicular ad hoc networks (VANETs) in which each communications node is a vehicle able to move along traffic lanes of a predefined road network.

In a vehicular ad hoc network, the mobile nodes form various groups dynamically over time and at any given time the mobile nodes within a group are interconnected but the groups are not connected to one another.

The formation of these groups is linked to traffic conditions, notably to the presence of traffic lights in an urban environment.

Moreover, each group of nodes is formed and disintegrates dynamically as a function of the movement of each mobile node liable to quit the group randomly at any time and to enter another at a later time.

As a result of this, the network suffers frequent changes of topology with a degree of connectivity that varies a great deal over time. Because of this, it is difficult to design algorithms offering high performance that are simple to use to broadcast data via all the nodes of such a network.

In a document entitled "An Information Propagation Scheme for VANETs" published in Proceedings of the 8th International IEEE Conference on Intelligent Transportation Systems, Vienna, Austria, Sep. 13-16, 2005, Thomas D. C. Little and Ashish Agarwal describe a method of broadcasting data in a vehicular ad hoc network in which the data packets propagate in the same direction of movement along a two-way traffic lane using the Directional Propagation Protocol (DPP).

However, the Directional Propagation Protocol requires a mechanism for forming and maintaining groups of nodes that is difficult to use and that may become extremely costly in terms of bandwidth use. Furthermore, that protocol does not provide for optimum broadcasting of data to all mobile nodes moving along a two-way traffic lane.

SUMMARY OF THE INVENTION

One aspect of the present invention is directed to a method of broadcasting at least one data packet in a network including a set of groups of mobile nodes.

The method includes an intragroup broadcasting phase during which at least one data packet is broadcast to the mobile nodes of the same group.

The intragroup broadcasting phase includes an initial broadcasting step during which a source node broadcasts said at least one data packet to a set of neighbor nodes.

The intragroup broadcasting phase further includes a step of electing two propagation nodes moving in opposite directions and located on respective opposite sides of the source node during which a first neighbor node of the source node is elected first propagation node on condition that it is located downstream of the source node relative to the direction of movement of the source node and is moving in the same direction as the source node and during which a second neighbor node of said source node is elected second propagation node on condition that it is located upstream of the source node relative to the direction of movement of the source node and is moving in the direction opposite to the direction of movement of said source node.

The method makes it possible to elect at least two propagation nodes located on respective opposite sides of the source node and that are moving in opposite directions away from each other. The packet therefore propagates simultaneously in two opposite directions of movement, which accelerates its dissemination in the network.

According to one feature of the present invention, the intragroup broadcasting phase further includes a directional propagation step during which each elected propagation node transmits the data packet to a relay node moving in the same direction as the propagation node and located downstream of said propagation node relative to the direction of movement of the propagation node.

During the directional propagation step, each propagation node broadcasts the data packet to its neighbor nodes and the relay node is elected from the neighbor nodes of the propagation node as a function of its distance from the propagation node. Taking account of the distance of each neighbor node from the propagation node makes it possible to elect as the relay node a node that is located downstream of the propagation node in the direction of movement of the propagation node, which is that one of the nodes located within range of the propagation node that is at the greatest distance from it. In this way the packet propagates as quickly as possible to nodes located at the periphery of the group.

According to one feature of the present invention, the directional propagation step further includes at least:
  a broadcast step during which a current relay node broadcasts the data packet to its neighbor nodes; and
  an election step during which a next relay node moving in the same direction as the current relay node and located downstream of said current relay node relative to the direction of movement of the current relay node is elected from among the neighbor nodes of said current relay node, the broadcast step and the election step being repeated until an elected node is a peripheral node of said group.

Thus in each movement direction the data packet is broadcast successively by a set of relay nodes in the direction of movement of each propagation node until the packet is received by a peripheral node. It should of course be noted that if the propagation node is close to the periphery of the group, the number of relay nodes can be relatively low, or even zero.

According to another feature of the present invention, the method further includes an intergroup broadcast phase during which the data packet is transmitted to another group of nodes via a transport node broadcasting the data packet while it is moving at regular time intervals during a periodic broadcast step until said transport node receives at least one Request To Broadcast in respect of the packet sent by at least one other mobile node.

It should of course be clear that such a transport node is the last peripheral node of the group carrying the packet. No longer finding any node within the group situated on its downstream side in its direction of movement, this peripheral node is not able to broadcast the packet to another relay node. It therefore stores this packet and transports it as it moves, thus becoming a transport node.

By broadcasting the data packet periodically, a transport node is able to transmit the data packet to any neighbor nodes at any time while it is moving. Accordingly, the data packet can be transferred to other groups via the transport node as soon as the transport node finds new neighbor nodes on its downstream side, i.e. as soon as it integrates a new group of nodes. It should be noted that the transport node may also be overtaken by another node in the same group, which then becomes a new peripheral node and thus the new transport node.

This is particularly advantageous for broadcasting data across a highly-partitioned network including a set of groups of nodes that are not a priori interconnected.

According to another feature of the present invention, the time interval between two successive iterations of the periodic broadcast step is determined by the transport node as a function of its speed of movement.

The dynamic adjustment of this time interval by the transport node makes it possible to adapt its transmission frequency as a function of its speed, which makes it possible to optimize the use of the bandwidth of the network by avoiding excessively frequent broadcasting. For example, the value of this time interval decreases as the speed of the mobile node increases. Thus a reduction in the speed of the node (for example because of an obstacle) has the effect of delaying the next broadcast.

According to another feature of the present invention, the intergroup broadcast phase further includes:
  a test step during which said transport node determines whether its direction of movement has changed since the last broadcasting of said packet by said node; and
  if not, the node acquires propagation node status and sends a Clear To Broadcast in respect of said packet to a neighbor node in response to a Request To Broadcast sent by said neighbor node;
  if so, the node acquires source node status and sends a Clear To Broadcast in respect of said packet to two neighbor nodes in response to a Request To Broadcast sent by the neighbor nodes.

Thus before any new broadcasting of the packet by the transport node, said node tests if its direction of movement has changed since it last broadcast the packet (i.e. since the last iteration of the periodic broadcasting step or since the first broadcast effected after the transport node received the data packet from a propagation node or a relay node). A change of movement direction occurs in particular if the transport node has changed traffic lane, for example at a junction.

It should be noted that the present patent application does not seek describe how the direction of movement of a node is evaluated. Such evaluation can in particular be based on the geographical coordinates of the nodes relative to the points of the compass.

One aspect of the present invention is directed to a mobile node including:
  means for receiving a data packet;
  means for determining a waiting time as a function of a distance between said mobile node and a mobile node transmitting said packet;
  means for commanding at the end of said waiting time means for transmitting a Request To Broadcast in respect of said packet to said transmitter mobile node;
  means for commanding, on reception of a Clear To Broadcast in respect of said packet, means for broadcasting said received packet;
  means for broadcasting the data packet at regular time intervals until reception of at least one Request To Broadcast in respect of said packet from at least one other mobile node; and
  means for sending a Clear To Broadcast in respect of said packet to at least one mobile node having transmitted one of said received Requests To Broadcast.

Another aspect of the present invention is directed to a system for broadcasting at least one data packet including a set of groups of mobile nodes forming a network.

According to an embodiment of the present invention, a group of nodes includes:
  a source node broadcasting said at least one data packet to a set of neighbor nodes within said group of nodes; and
  two propagation nodes moving in opposite directions and located on respective opposite sides of the source node, a first neighbor node of said source node being elected first propagation node on condition that it is located downstream of the source node relative to the direction of movement of the source node and is moving in the same direction as the source node and a second neighbor node of said source node being elected second propagation node on condition that it is located upstream of the source node relative to the direction of movement of the source node and is moving in the direction opposite the direction of movement of said source node, each propagation node broadcasting the data packet.

According to another feature of the present invention, a group of nodes further includes:
  at least one relay node moving in the same direction as one of said propagation nodes and located downstream of said propagation node relative to the direction of movement of the propagation node; and
  at least one transport node located at the periphery of the group of nodes, adapted to receive said data packet from one of said propagation nodes or from one of said relay nodes and to transmit the data packet to another group of nodes of said system.

Once again, it should be noted that the group of nodes of such a system may not include the relay node if the propagation node is sufficiently close to the periphery of the group to transmit the packet of data directly to a transport node.

Another aspect of the present invention is directed to a computer program adapted to be executed by processing means (a processor) of a mobile node according to an embodiment of the invention, the program including instructions for executing the following steps:
  receiving a data packet;
  determining a waiting time as a function of the distance between said mobile node and a mobile node sending said packet;
  at the end of said waiting time, commanding means for transmitting a Request To Broadcast in respect of said packet to said transmitter mobile node;
  on reception of a Clear To Broadcast in respect of said packet, commanding means for broadcasting said received packet;
  broadcasting the data packet at regular time intervals until reception of at least one Request To Broadcast in respect of said packet from at least one other mobile node; and
  sending a Clear To Broadcast in respect of said packet to at least one mobile node having sent one of said received Requests To Broadcast.

This program may use any programming language and take the form of source code, object code, or a code intermediate between source code and object code, such as a partially-compiled form, or any other desirable form.

The above program may be stored on a data medium. Consequently, another aspect of the invention is directed to a computer-readable storage medium storing the above computer program in the form of a series of program code instructions intended to be executed on a computer and more particularly on processing means (processor) of a wireless computer terminal.

The information medium may be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium may be a transmissible medium such as an electrical or optical signal, which may be routed via an electrical or optical cable, by radio or by other means. The program of the invention may in particular be downloaded over an Internet-type network.

Alternatively, the information medium may be an integrated circuit incorporating the program, the circuit being adapted to execute the data packet broadcasting method of the invention or to be used in its execution.

BRIEF DESCRIPTION OF THE DRAWINGS

Other features and advantages of the present invention emerge from the description given below with reference to the appended drawings, which show one non-limiting implementation thereof and in which.

DETAILED DESCRIPTION OF AN IMPLEMENTATION

The present invention is described in detail below in the context of a vehicular ad hoc network (VANET) formed by a plurality of mobile nodes moving across a road network in an urban environment.

It should be noted that although the invention applies with particular advantage to an urban environment, it is not limited to that context, and can equally well be used on a motorway network, for example.

Figure 1:
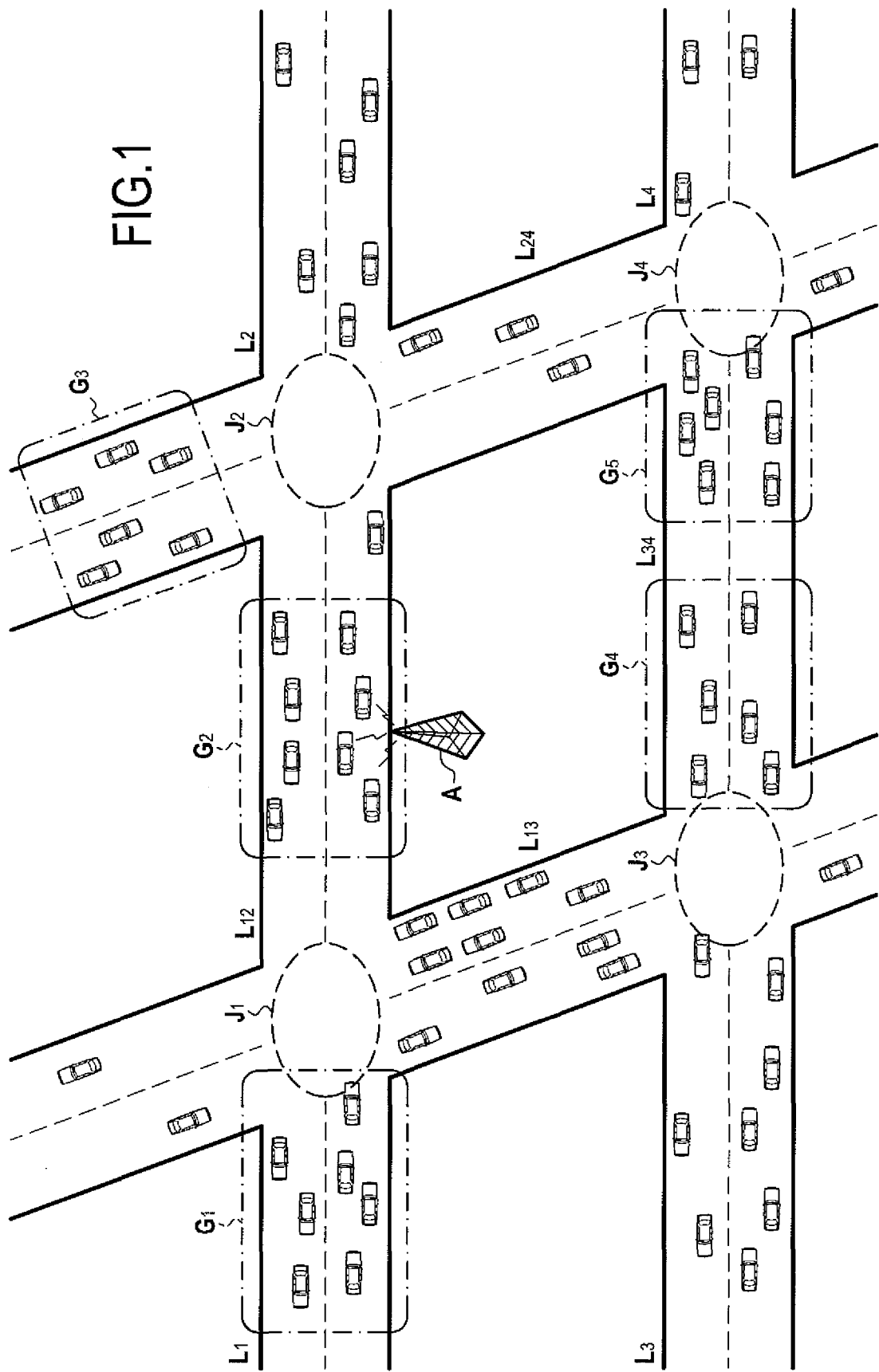
FIG. 1 shows diagrammatically a set of groups of mobile nodes forming a vehicular ad hoc network on an urban road network in which the present invention is used.

FIG. 1 represents diagrammatically a set of groups G1, G2, G3, G4, G5 of mobile nodes that form a vehicular ad hoc network in a road network including a plurality of two-way traffic lanes L1, L12, L2, L13, L3, L34, L24, L4 forming between them a plurality of junctions $J_1, J_2, J_3, J_4$.

Each mobile node that is a member of the vehicular ad hoc network consists of a vehicle able to move along the traffic lanes and across the junctions $J_1, J_2, J_3, J_4$ of the road network.

The vehicles are able to determine their location in the road network at any time. To this end, each vehicle is equipped with a standard satellite navigation system including:

a receiver, for example a GPS (Global Positioning System) or Galileo-type receiver, able to obtain its own geographical coordinates at any time; and a digital road map representing the road network coupled to the GPS-type receiver to display the instantaneous position of the vehicle on the road map.

Each node is equipped with a wireless communications terminal. Thus each node is able to communicate with its neighbor nodes and more particularly able to broadcast data packets.

In this example, the communications terminal is a Wi-Fi™ transceiver communicating using the IEEE 802.11 protocol. However, the person skilled in the art could obviously use other wireless communication technologies such as the infrared technology.

Below, the expression "neighbor node" referring to a reference node denotes any node located within transmission range of the reference node defined by a range radius.

In this example, the range radius of a mobile node is fixed at 250 meters in accordance with the recommendations of the Dedicated Short-Range Communications (DSRC) standard.

As shown in FIG. 1, the groups of nodes G1, G2, G3, G4, G5 of the vehicular ad hoc network are not interconnected (i.e. they cannot communicate directly with each other, no node of one group being within range of a node of another group). The nodes in the same group move along two-way traffic lanes and are interconnected at any given time. Each group of nodes is constituted naturally as a function of the relative distance away of each node according to radio transmission range.

A broadcasting station A is placed alongside a traffic lane $L_{12}$ to introduce the data packets into the ad hoc network.

The broadcasting of a data packet D within a group G of nodes during an intragroup broadcasting phase $P_1$ is described below with reference to FIGS. 2 and 3.

During an initial step $E_1$, the data packet D to be broadcast is received by a source node S. The source node S is a data packet carrier node having the responsibility of initializing the broadcasting of this packet within the group to which it belongs.

In this example, it is considered that a node is elected as the source node S as soon as it acquires the data packet sent by the broadcasting node A.

The mechanism employed to elect the source node conforms to the IEEE 802.11 RTS/CTS (Request To Send/Clear To Send) protocol with the result that the terminal A selects the source node from all nodes located in the vicinity of the terminal A that have sent a request. The terminal A transmits the data packet in unicast mode accompanied by the clearance to send to the node nearest the terminal or the node that sent the request fastest.

If no such terminal exists, a node belonging to a group of nodes can be self-elected as the source node from the time that it generates autonomously a data packet to be broadcast.

During an insertion step $E_2$, the source node S inserts into the data packet location information including its current geographical coordinates $C_n$ and its preceding coordinates $C_{n-1}$ obtained at an earlier time and that it saves in memory for a predetermined period. These current and previous coordinates are provided to enable a node receiving the data packet to determine the direction of movement of the source node.

During this same insertion step $E_2$, the source node generates in the data packet a TTL (Time To Live) field including a variable H that identifies the status of the carrier node of the data packet. The value of this variable is initialized to 0 by the source node, which increments it before broadcasting the data packet, with the result that H=1.

Figure 2:
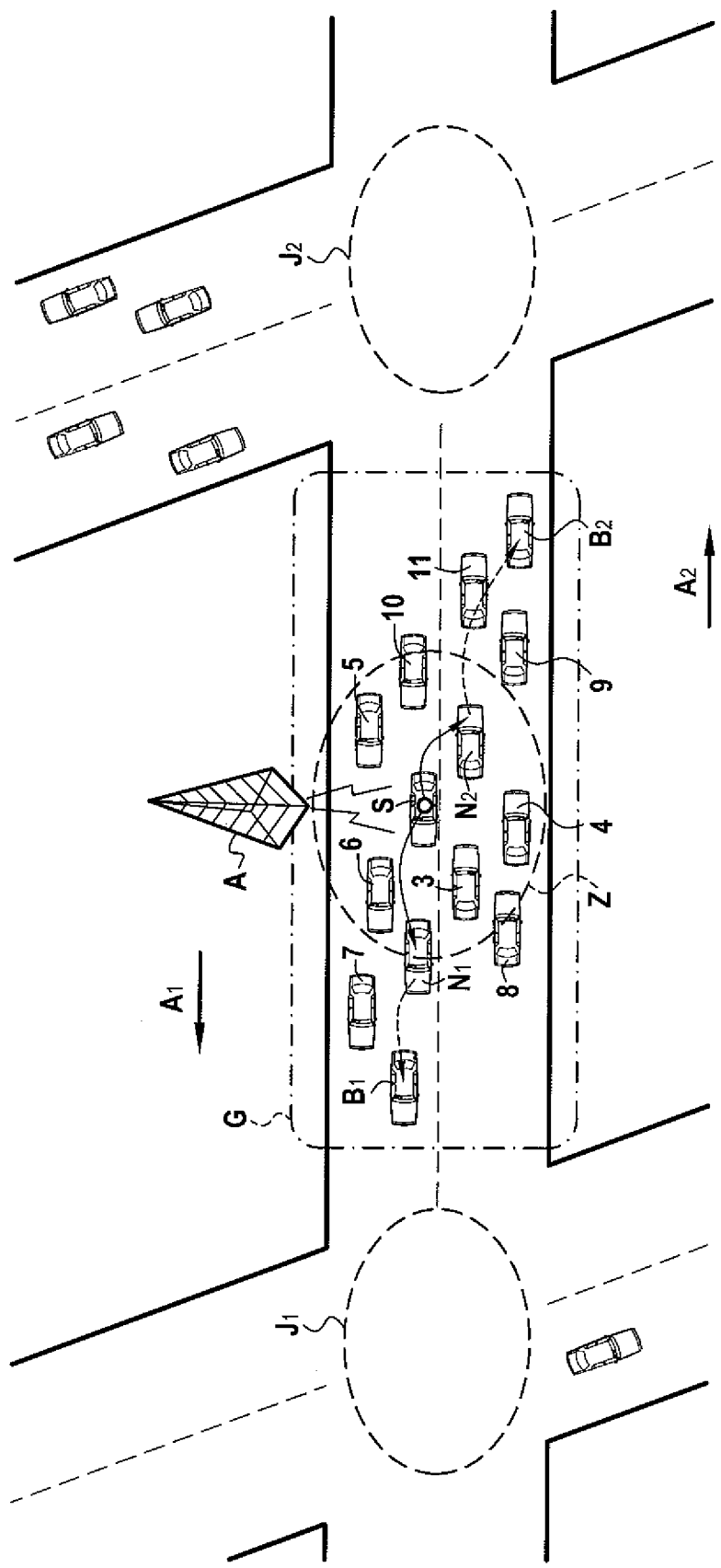
FIG. 2 illustrates diagrammatically an example of a scenario whereby the data packet is broadcast within a group during an intragroup broadcasting phase of the present invention.
Figure 3:
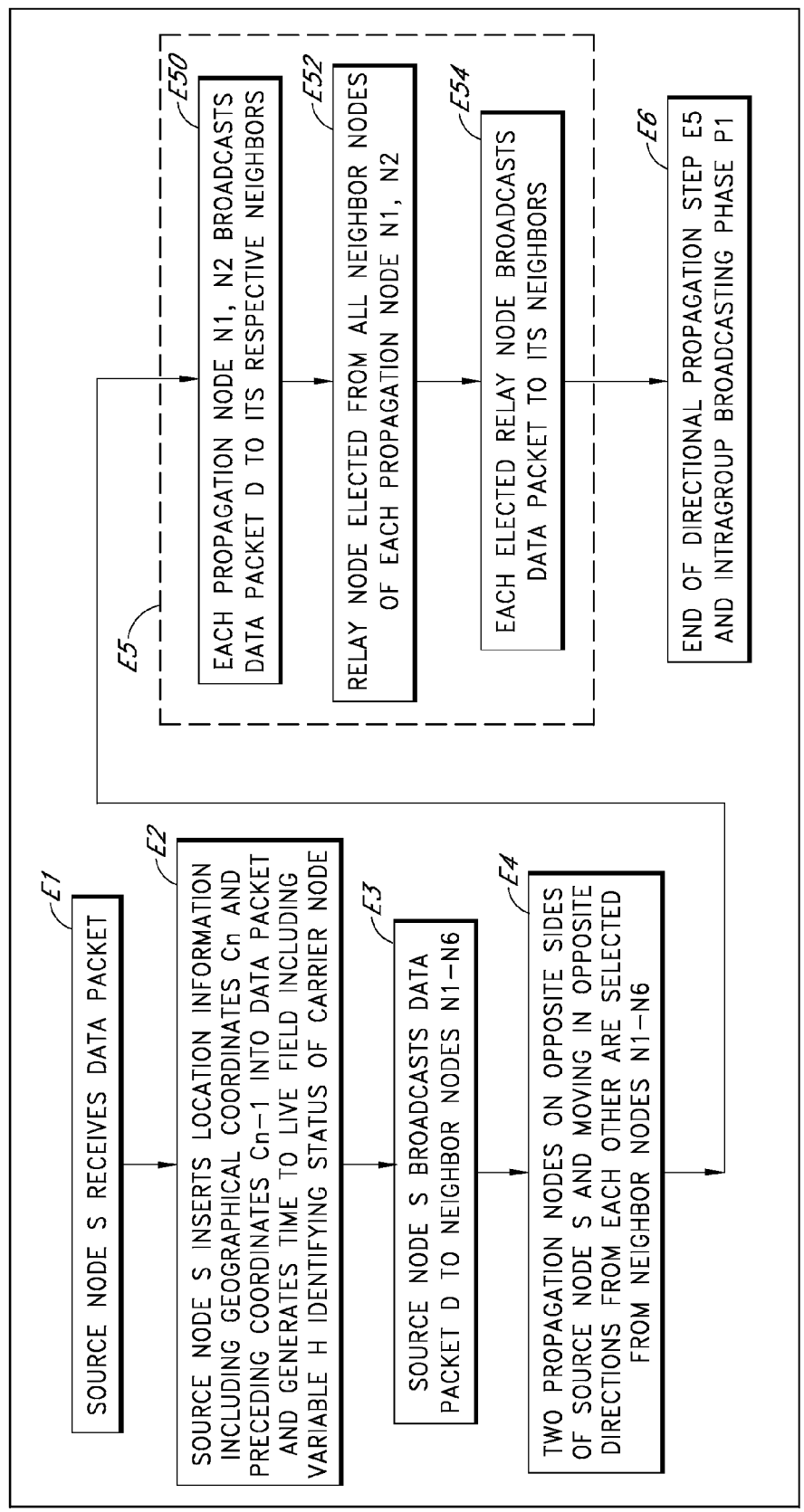
FIG. 3 shows in flowchart form the steps of the intragroup broadcasting phase of the invention.

During an initial broadcasting step $E_3$, the source node S broadcasts the data packet D to its neighbor nodes $N_1$, $N_2$, 3, 4, 5, 6 located in a coverage area Z with a radius equal to the transmission range R of the source node S, as shown in FIG. 2.

During an election step $E_4$, two propagation nodes $N_1$, $N_2$ are elected from among the neighbor nodes $N_1$, $N_2$, 3, 4, 5, 6 of the source node S. According to the present invention, the elected propagation nodes $N_1$, $N_2$ are located on respective opposite sides of the source node S and are moving in opposite directions away from each other.

Each elected propagation node $N_1$, $N_2$ makes it possible to start a directional propagation step $E_5$ during which the data packet D is transmitted by broadcasting it successively in the respective direction of movement $A_1$, $A_2$ of each propagation node $N_1$, $N_2$.

To this end, during a broadcasting substep $E_{50}$, each propagation node $N_1$, $N_2$ broadcasts the data packet D to its respective neighbors 7, 8, $B_1$; 9, 10, 11, $B_2$.

During an election substep $E_{52}$, a relay node is elected from among all the neighbor nodes of each propagation node $N_1$, $N_2$, each elected relay node moving in the same direction as the respective propagation node and being located ahead thereof in its direction of movement. Accordingly, the data packet is transmitted from each propagation node to a relay node in the direction of movement of each propagation node.

During a broadcasting substep $E_{54}$, each elected relay node broadcasts the data packet to its neighbors. In the FIG. 2 example, the elected relay nodes are nodes located at the periphery of the group G and corresponding to peripheral nodes $B_1$, $B_2$.

The reception of the data packet D by the peripheral nodes $B_1$, $B_2$ during a reception step $E_6$ marks the end of the directional propagation step $E_5$ and the intragroup broadcasting phase $P_1$.

The step $E_4$ of electing the propagation nodes $N_1$, $N_2$ is described below in detail with reference to FIGS. 4 and 5.

On reception of the data packet D sent by the source node S (step $E_{400}$), each neighbor node $N_1$, $N_2$, 3, 4, 5, 6, of the source node S extracts from the data packet D the current geographical coordinates $C_n$ and the previous geographical coordinates $C_{n-1}$ of the source node S and the value of the variable H=1 during an extraction step $E_{401}$.

Because H=1, each node receiving the packet determines that it was received from a source node S.

From the geographical coordinates $C_n$, $C_{n-1}$ of the source node S, each neighbor node $N_1$, $N_2$, 3, 4, 5, 6, of the source node S determines the direction of movement of the source node S relative to its own direction of movement during a first calculation step $E_{402}$.

During a selection step $E_{403}$, each neighbor node $N_1$, $N_2$, 3, 4, 5, 6, 10 of the source node S determines whether it is a candidate for election as a propagation node.

To this end, each neighbor node $N_1$, $N_2$, 3, 4, 5, 6, 10 determines whether it is moving in the same direction as the source node S (step $E_{4031}$). If so, each node $N_1$, 6, 5, 10 concerned determines whether it is located ahead of the source node S relative to the direction of movement of the source node S (step $E_{4032}$). Of the nodes $N_1$, 6, 5, 10 moving in the same direction as the source node, only the nodes $N_1$, 6 are located ahead of the source node S in the direction of movement of the source node S. Consequently, they are the only candidates for election of the propagation node in the direction of movement of the source node S. Although the nodes 5, 10 are moving in the same direction as the source node S, they are not candidates for election because they are not located ahead of the source node S in the direction of movement of the source node S.

A similar procedure makes it possible to determine all the candidate nodes for election of the propagation node $N_2$ in the direction of movement opposite that of the source node S. To this end, each neighbor node $N_1$, $N_2$, 3, 4, 5, 6, 10 determines whether it is moving in the opposite direction to the source node S (step $E_{4033}$). If so, each node $N_2$, 3, 4 concerned determines whether it is located ahead of the source node S in the direction of movement opposite that of the source node S (step $E_{4034}$). Of the nodes $N_2$, 3, 4 moving in the opposite direction to the source node S, only the nodes $N_2$, 4 are located ahead of the source node S in the direction of movement of the source node S. Consequently, they are the only candidates for election of the propagation node $N_2$ in the direction of movement opposite that of the source node S.

Each candidate node selected during the previous selection step $E_{403}$ (namely $N_1$, $N_2$, 4, 6) determines from its own instantaneous geographical coordinates and the geographical coordinates $C_n$, of the source node S during a second calculation step $E_{404}$ the distance $d_i$ (i.e. respectively $d_1$, $d_2$, $d_4$, $d_6$) that separates it from the source node S.

During a third calculation step $E_{405}$, each candidate node $N_1$, $N_2$, 4, 6 calculates a waiting time $WT_i$ (respectively $WT_1$, $WT_2$, $WT_4$, $WT_6$) at the end of which it is cleared to send a Request To Broadcast the data packet D.

The waiting time $WT_i$ calculated by each candidate node $N_1$, $N_2$, 4, 6 as a function of its respective distance $d_i$ (respectively $d_1$, $d_2$, $d_4$, $d_6$) relative to the source node S, in accordance with the following equation:

$$WT_i(d_i) = WT_{Max}\left(1 - \frac{\min\{d_i, R\}}{R}\right) \qquad \text{(Equation 1)}$$

in which $WT_i$ is the waiting time assigned to the $i^{th}$ candidate node;

$WT_{Max}$ is a maximum waiting time that can be assigned to a candidate node, such that $W_{max} = WT_i(d_i=0)$;

min { } is the minimum function;

$d_i$ is the distance separating the $i^{th}$ candidate from the source node S; and R is the transmission range of a mobile node.

From equation 1, the value of the calculated waiting time $WT_i$ decreases as the distance of the candidate node from the source node S increases.

Figure 4:
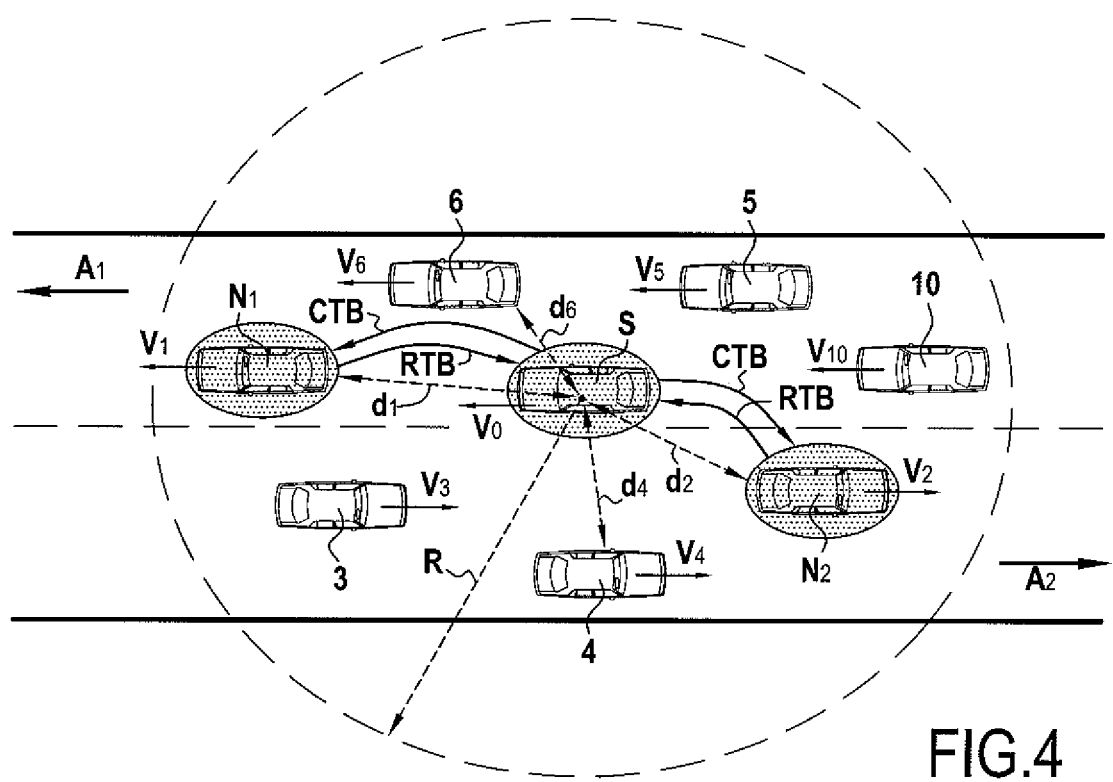
FIG. 4 illustrates diagrammatically an example of a scenario in accordance with the present invention whereby two propagation nodes are elected in the vicinity of a source node.
Figure 5A:
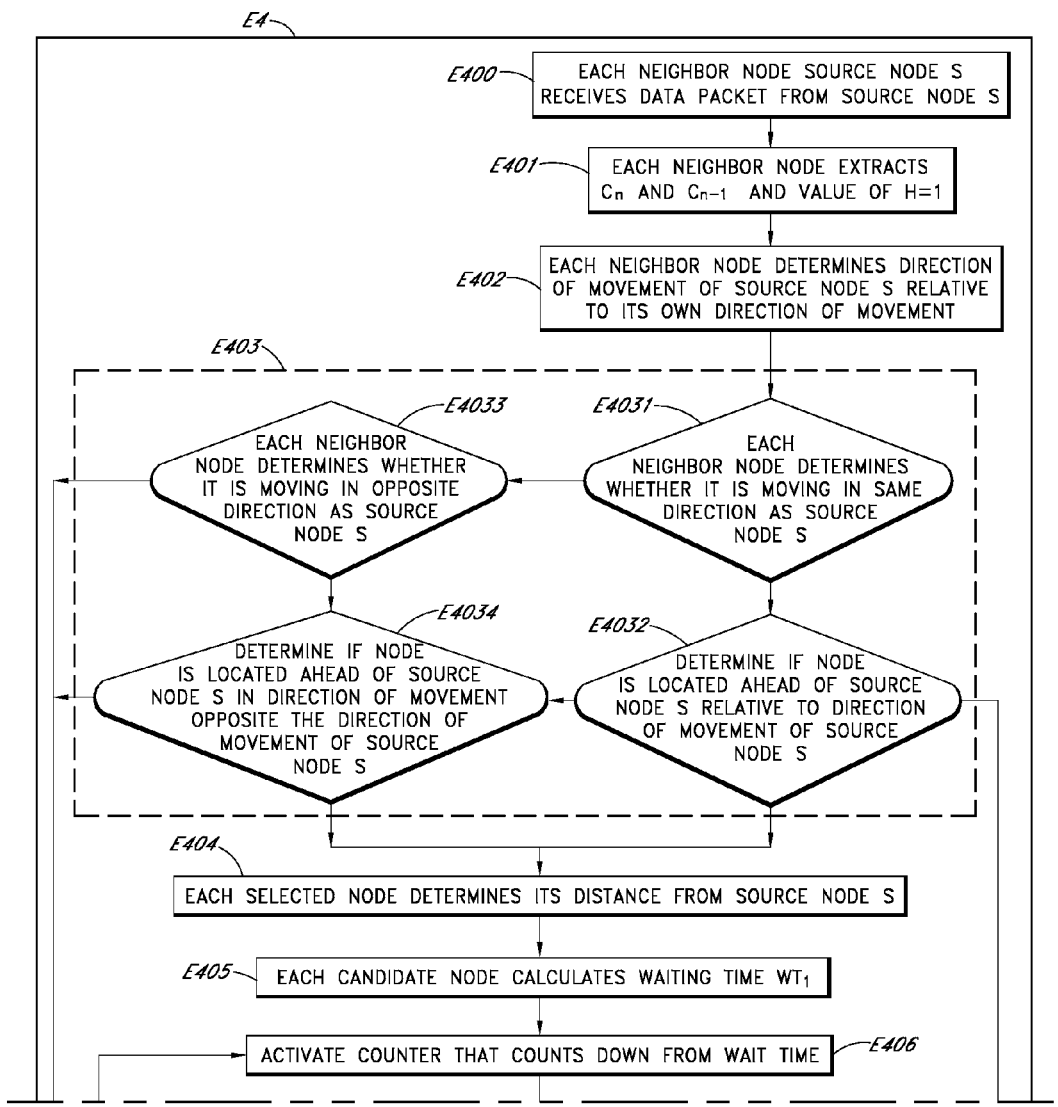
FIG. 5 shows in flowchart form the steps of the method of the invention for electing a propagation node.
Figure 5B:
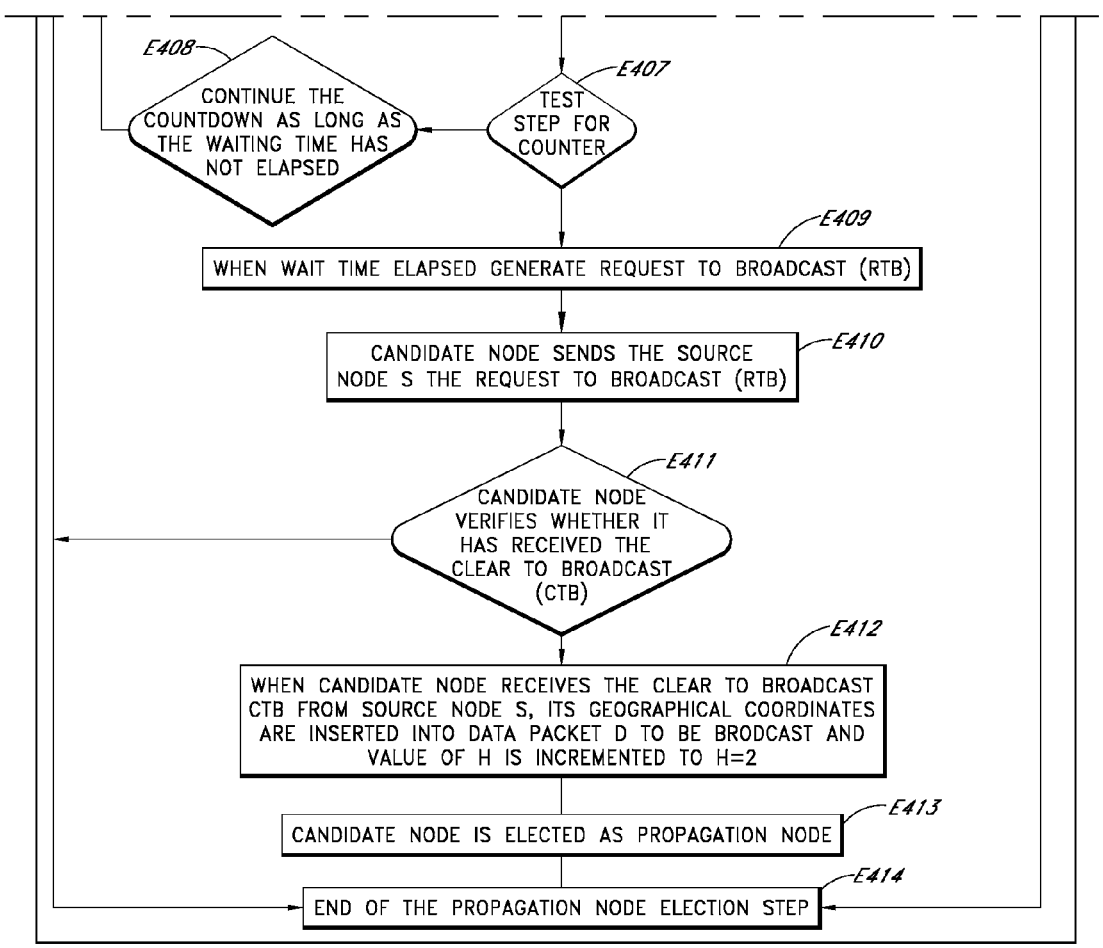

Accordingly, in the FIG. 4 example, since the candidate node $N_1$ is farther than the candidate node 6 ($d_1 > d_6$) from the source node S, the candidate node $N_1$ calculates a waiting time $WT_1$ less than the waiting time $WT_6$ calculated by the candidate node 6. From equation 1, $WT_1=Wr_{Max}(1-d_1/R)<WT_6=WT_{Max}(1-d_6/R)$.

Similarly, in the other propagation direction of the packet, since the candidate node $N_2$ is farther away than the candidate node 4 ($d_2>d_4$), said node $N_2$ calculates a waiting time $WT_2$ less than the waiting time $WT_4$ calculated by the node 4. From equation 1, $WT_2=WT_{max}(1-d_2/R)<WT_4=WT_{Max}(1-d_4/R)$.

It should be noted that the position of a node is inevitably determined with an uncertainty inherent to the GPS receiver. Accordingly, if a candidate node is at the periphery of the coverage area of the source node at the time of reception of the data packet D it is possible for the distance $d_i$ calculated by the candidate node to be slightly greater than the transmission range R. In this situation, equation 1 provides for the candidate node to calculate a zero waiting time ($WT_i(d_i>R)=0$) to enable it to send immediately a Request To Broadcast the data packet.

As soon as a candidate node has calculated the value of its waiting time, it activates a counter that counts down from this value during a countdown step $E_{406}$.

As soon as the waiting time of a candidate node has elapsed (test step $E_{407}$ positive), that node generates during a generation step $E_{409}$ a Request To Broadcast (RTB) into which it inserts its current and previous geographical coordinates. The insertion of the current and previous coordinates makes it possible for the node receiving the Request To Broadcast RTB to determine the direction of movement of the node sending said request.

During a broadcasting step $E_{410}$, the candidate node sends the source node S the Request To Broadcast RTB previously generated during the step $E_{409}$.

In response to this Request To Broadcast RTB, the source node S sends the candidate node a broadcast command Clear To Broadcast in respect of the data packet D, using the geographical coordinates of the candidate node contained in the Request To Broadcast RTB.

In the FIG. 4 example, the source node S sends a Clear To Broadcast CTB to the candidate nodes $N_1$ and $N_2$ moving in opposite directions that are the first candidate nodes to have sent a Request To Broadcast RTB.

During a test step $E_{411}$, the candidate node verifies whether it has received the Clear To Broadcast CTB. As soon as a candidate node receives the Clear To Broadcast CTB coming from the source node S, it inserts its geographical coordinates into the data packet D to be broadcast and increments the value of H such that H=2 during an insertion step $E_{412}$ and, because of this, is elected propagation node $N_1$, $N_2$ (step $E_{413}$), which marks the end (step $E_{414}$) of the propagation node election step $E_4$.

The sending of the Request To Broadcast RTB by a candidate node at the end of a waiting time that decreases as the distance of that node relative to the source node increases advantageously makes it possible to elect in a decentralized manner propagation nodes that are as far as possible from the source node.

The step of directional propagation in a direction of movement of the propagation node $N_1$ (the direction of movement of the source node) is described below in detail with reference to FIGS. 6 and 7. Obviously, this description may be transposed directly to the propagation node $N_2$ moving in the opposite direction.

Figure 6:
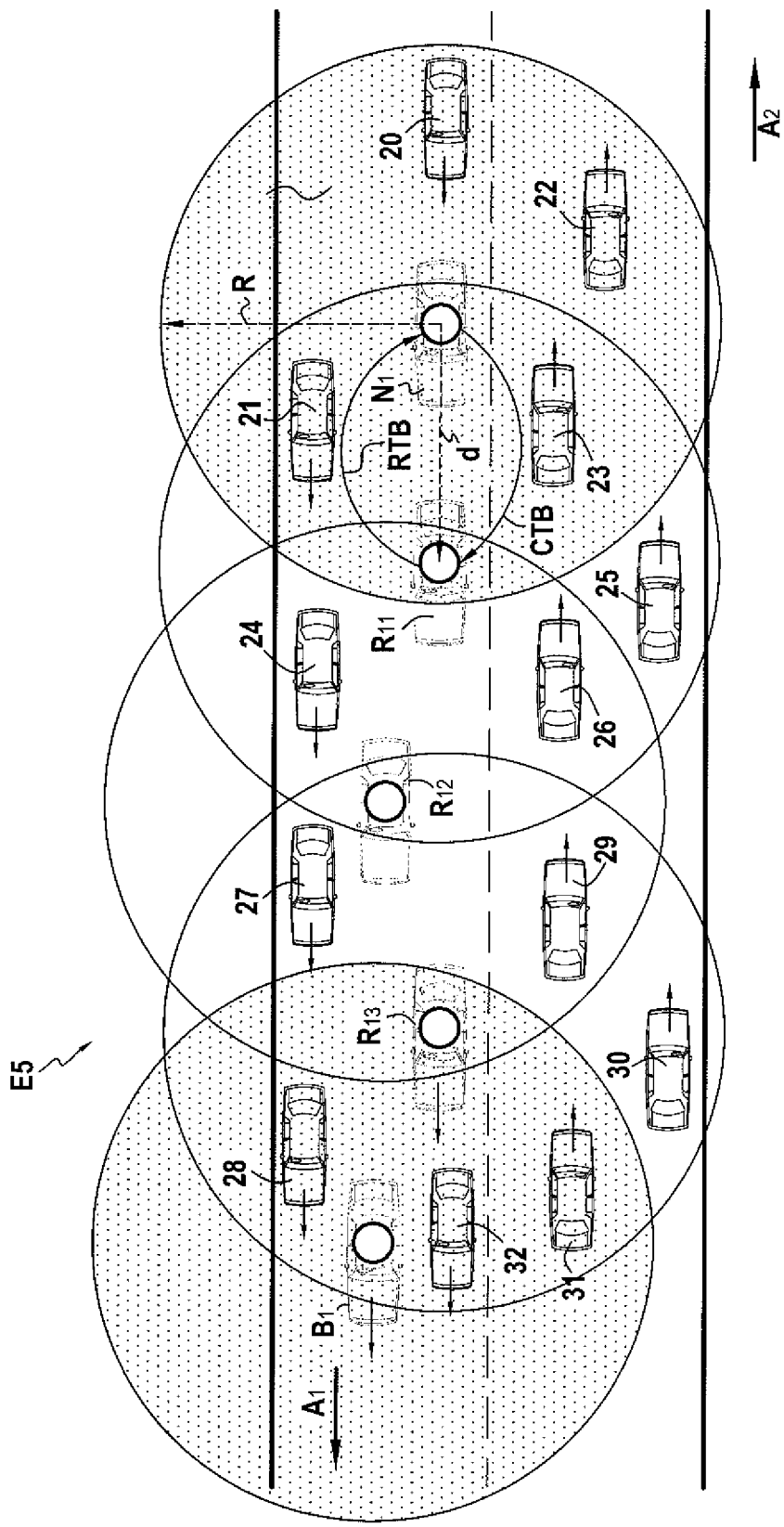
FIG. 6 illustrates diagrammatically an example of a scenario in accordance with the present invention in which a data packet is sent from a propagation node to a peripheral node.

As shown in FIG. 6, the data packet D propagated from the propagation node $N_1$ is then relayed by a set of successively elected relay nodes in the direction of movement of the propagation node $N_1$ (the direction of movement of the source node 8).

The propagation node $N_1$ elected during the election step $E_4$ broadcasts the data packet D to its neighbor nodes 20, 21, 22, 23, $R_{11}$ during the broadcasting step $E_{50}$.

On reception (step $E_{520}$) of the data packet D sent by the propagation node $N_1$, each neighbor node 20, 21, 22, 23, $R_{11}$ of the propagation node $N_1$ extracts from the received data packet D during an extraction step $E_{521}$ the geographical coordinates $C_m$, $C_{m-1}$, of the propagation node $N_1$ and the value of the variable H. Given that H=2, each node receiving the data packet determines that the packet is received from a propagation node.

From the geographical coordinates $C_m$, $C_{m-1}$ of the propagation node $N_1$, each neighbor node 20, 21, 22, 23, $R_{11}$ of the propagation node $N_1$ determines the direction of movement of the propagation node $N_1$ relative to its own direction of movement during a first calculation step $E_{522}$.

During a selection step $E_{523}$, each neighbor node 20, 21, 22, 23, $R_{11}$ determines whether it is a candidate node for election of a relay node.

To this end, each neighbor node 20, 21, 22, 23, $R_{11}$ determines whether it is moving in the same direction as the propagation node $N_1$ (step $E_{5230}$). If so, each node 20, 21, $R_{11}$ concerned determines whether it is located ahead of the propagation node $N_1$ relative to the direction of movement of the propagation node $N_1$ (step $E_{5231}$). Of the nodes 20, 21, $R_{11}$ moving in the same direction as the propagation node $N_1$, only the nodes 21, $R_{11}$ are located to the rear of the propagation node $N_1$ in the direction of movement of the propagation node $N_1$. Consequently, the candidate nodes for election of the relay node in the direction of movement of the propagation node $N_1$ are the neighbor nodes 21 and $R_{11}$.

Each candidate node selected during the preceding selection step $E_{523}$ determines during a second calculation step $E_{524}$ the distance $d_i$ between it and the propagation node $N_1$ from its own instantaneous geographical coordinates and the geographical coordinates $C_m$ of the propagation node $N_1$ extracted from the data packet D.

Accordingly, in the FIG. 6 example, each candidate node 21, $R_{11}$ calculates the distance $d_i$ between it and the propagation node $N_1$ (respective $d_{21}$, $d_{11}$).

During a third calculation step $E_{525}$, each candidate node 21, $R_{11}$ calculates a waiting time $WT_i$ at the end of which the candidate node is authorized to send a Request To Broadcast the data packet D.

The waiting time $WT_i$ is calculated in the same manner as during the step $E_{405}$ relating to the election of the propagation nodes as described above with reference to FIG. 5. Accordingly, each candidate node 21, $R_{11}$ calculates its waiting time (respectively $WT_{21}$, $WT_{11}$) as a function of its respective distance $d_i$ (respectively $d_{11}$, $d_{21}$) away from the propagation node $N_1$ using equation 1.

In the FIG. 6 example, since the candidate node $R_{11}$ is farther away than the candidate node 21 ($d_{11}>d_{21}$) relative to the propagation node $N_1$, said candidate node $R_{11}$ calculates a waiting time $WT_{11}$ less than the waiting time $WT_{21}$ calculated by the node 21. From equation 1, $WT_{11}=WT_{Max}(1-d_{11}/R)-WT_{21}=WT_{Max}(1-d_{21}/R)$.

As soon as a candidate node has calculated the value of its waiting time, it activates a counter that counts down from this value during a countdown step $E_{526}$. Each candidate node continues the countdown as long as the waiting time has not elapsed (test step $E_{527}$ negative) and no node has been elected relay node (test step $E_{528}$ negative).

As soon as the waiting time of a candidate node has elapsed (test step $E_{527}$ positive), said node generates a Request To Broadcast RTB during a generation step $E_{529}$. During a broadcast step $E_{530}$, the candidate node sends the Request To Broadcast to the propagation node $N_1$.

In response to this Request To Broadcast RTB, the propagation node $N_1$ sends the candidate node that sent the request a Clear To Broadcast in respect of the data packet D.

In the FIG. 6 example, the propagation node $N_1$ sends a Clear To Broadcast CTB to the candidate node $R_{11}$ that was the first node to send a Request To Broadcast RTB.

During a test step $E_{531}$, the candidate node verifies whether it has received the Clear To Broadcast CTB from the propagation node $N_1$. As soon as it has received it, the candidate node inserts its geographical coordinates into the data packet to be broadcast during an insertion step $E_{532}$ and because of this is elected relay node $R_{11}$ (step $E_{533}$). This marks the end (step $E_{534}$) of the step $E_{52}$ of electing a relay node.

As soon as a relay node has been elected during the election step $E_{52}$, said node broadcasts the data packet D to all its neighbor nodes during the broadcast step $E_{54}$.

Figure 7:
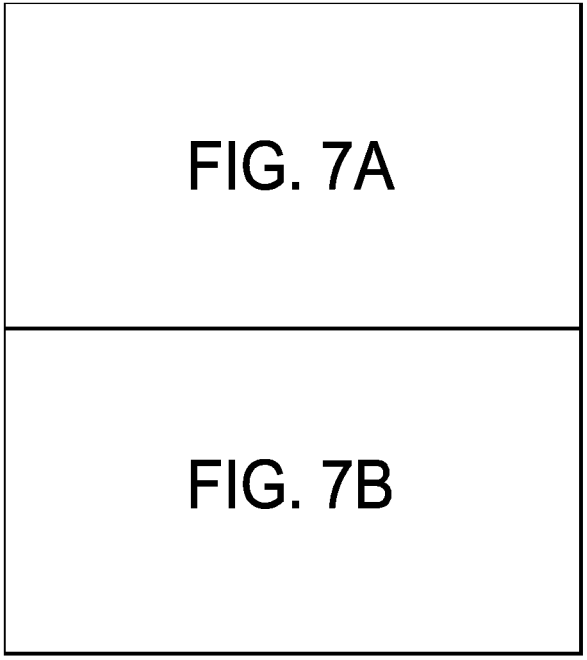
FIG. 7 shows in flowchart form the steps of the method of the invention for electing a propagation node.

On reception of the data packet D, the election step $E_{52}$ is repeated with the result that the steps $E_{520}$-$E_{534}$ already described with reference to FIG. 7 are executed at each neighbor node of the relay node to elect a new relay node that in turn assumes responsibility for broadcasting the data packet D.

In the FIG. 6 example, the election step $E_{52}$ and the broadcast step $E_{54}$ are repeated to determine a set of relay nodes $R_{11}$, $R_{12}$, $R_{13}$, $B_1$ for routing the data packet D to a peripheral node $B_1$.

For example, the current relay node $R_{11}$ sends a Clear To Broadcast CTB to the node $R_{12}$, which becomes the new relay node, in response to a Request To Broadcast RTB that the node $R_{12}$ sent during the sending step $E_{530}$.

If the current relay node does not receive a Request To Broadcast RTB during a predetermined time interval, the current relay node is a peripheral node of the group of nodes concerned. This is precisely the situation of the node $B_1$, which is located at the periphery of the group of nodes. After broadcasting the data packet during the broadcast step $E_{54}$, the node $B_1$ does not receive any Request To Broadcast RTB as there is no node ahead of it.

The groups of mobile nodes form and disintegrate naturally and dynamically over time as a function of the movements of each node of the ad hoc network.

In order to transmit the data packet to other groups of nodes, the method of the invention provides an intergroup broadcast phase $P_2$ that will be described in detail now with reference to FIGS. 8, 9, and 10.

As soon as a peripheral node $B_1$, $B_2$ carrying the data packet quits a group of nodes, said node becomes a transport node $T_1$, $T_2$ (initial step $E_{10}$ of the intergroup broadcast phase $P_2$) that is to transmit the data packet D to at least one other group while it is moving.

To this end, each transport node stores the data packet D and broadcasts it at regular time intervals as it moves.

The time interval between two successive broadcasts effected by a transport node is adjusted dynamically as a function of the speed of movement of the node, with the result that the time interval decreases as the speed of the node increases. Accordingly, a reduction in the speed of the transport node caused by an obstacle, for example (such as a red light in an urban environment) has the effect of delaying the next broadcast of the data packet. The slower a node is moving the less frequently it broadcasts the data packet.

This has the advantage of making it possible to provide spatially continuous coverage by the transport node as it moves, at the same time as avoiding broadcasting the data packet too frequently, which would have the effect of unnecessarily overloading the bandwidth assigned to the network.

Figure 8:
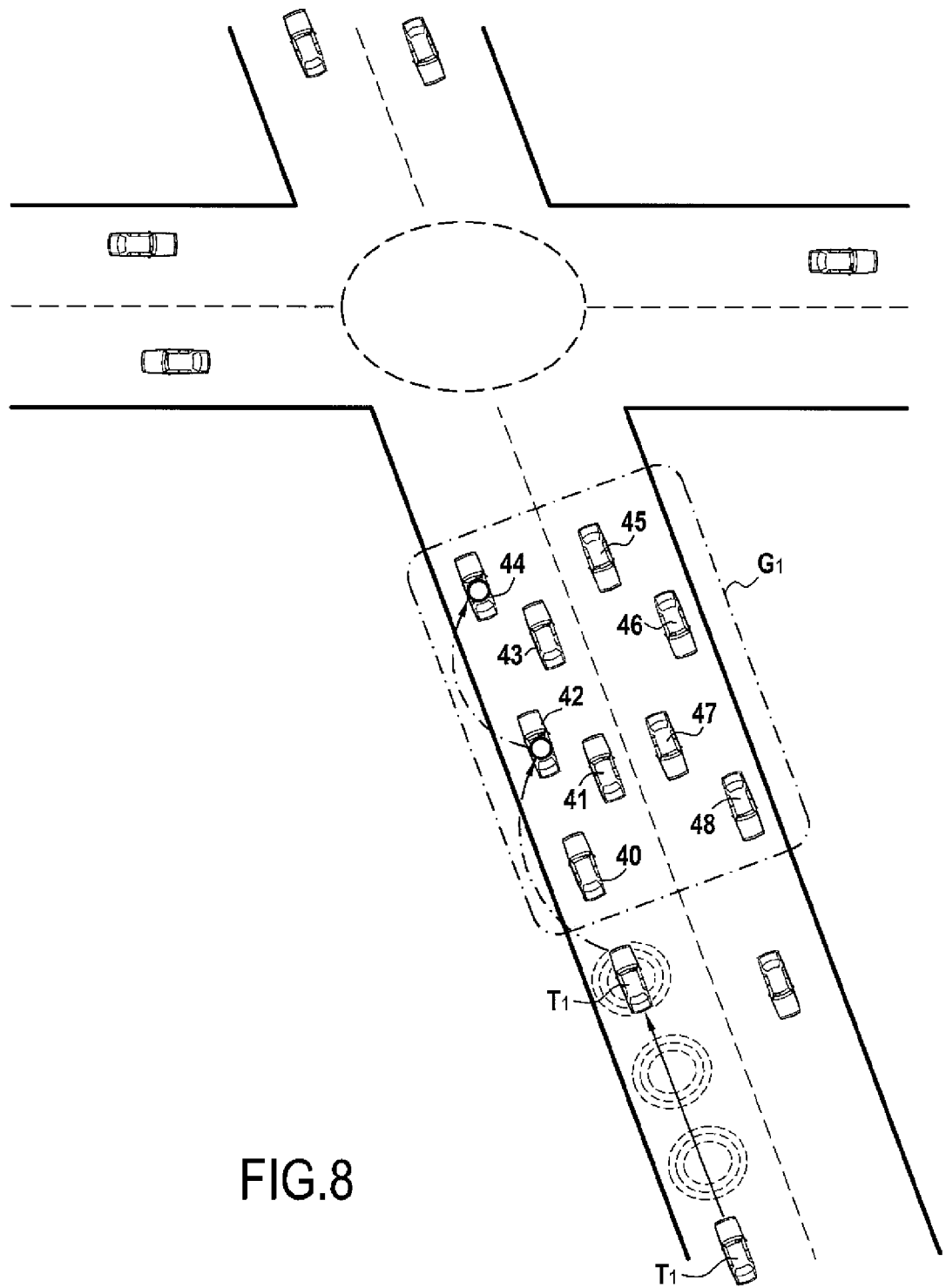
FIG. 8 illustrates diagrammatically a first example of a scenario according to the present invention in which a peripheral node transmits the data packet to another group of nodes during an intergroup broadcasting step.

In the FIG. 8 example, it is assumed that the peripheral node $B_1$ has been detached from the group of nodes G to which it belonged and that it is moving in the direction of another group of nodes $G_1$ along a traffic lane. Not being attached to any group, the peripheral node $B_1$ therefore becomes a transport node $T_1$ during the initial step $E_{10}$ of the intergroup broadcast phase $P_2$.

In this example, it is considered that when a peripheral node $B_1$, $B_2$ carrying the data packet quits a group of nodes, said node becomes a transport node $T_1$, $T_2$ intended to transmit the data packet D to at least one other group of nodes while it is moving. The transport node status is acquired during an initial step $E_{10}$ of the intergroup broadcast phase $P_2$. For a transport node, the value of the variable H is H=2, because this variable has already been incremented once during broadcasting of the data packet D by the source node and once during broadcasting of the data packet D by a propagation node.

When a node has acquired the transport node status, it determines during a test step $E_{12}$ if its direction of movement has recently changed and consequently if it has changed traffic lane since the time at which it acquired the transport node status.

In the manner known in the art, each node is able to memorize its own route by means of its onboard navigation device and consequently is able to determine its current direction of movement and to compare it with its direction of movement at an earlier time.

If the transport node determines a change in its direction of movement during the test step $E_{12}$, it updates the variable H in the data packet D by assigning it the value H=1 during an update step $E_{14}$. The fact that H=1 indicates that the transport node of the invention has acquired source node status.

During a periodic broadcast step $E_{15}$, the transport node broadcasts the data packet, which is eventually received by neighbor nodes of the transport node.

If the transport node does not determine any change in its direction of movement during the test step $E_{12}$, it goes directly to the periodic broadcast step $E_{16}$. In this situation, the variable H retains its value of 2 and the transport node then serves as a propagation node of the invention.

Following the broadcasting of the data packet, when a data packet receiver node (a neighbor node of the transport node) receives said packet, it extracts from it the value of the variable H and the current and earlier geographical coordinates of the sender node.

If H=1, the data packet is received directly from a sender node having source node status. Under such circumstances, the receiver node sends a Request To Broadcast RTB to the sending node on condition that it is located:
  downstream of the transmitter node (source node) relative to the direction of movement of the transmitter node and is moving in the same direction as the transmitter node; or
  upstream of the transmitter node (source node) relative to the direction of movement of the transmitter node and is moving in the direction opposite to the direction of movement of said transmitter node.

The receiver node generates and broadcasts a Request To Broadcast RTB into which it inserts its direction of movement (or alternatively its current and earlier coordinates enabling its direction of movement to be determined).

If H=2, then the data packet is received directly from a transmitter node having propagation node status. Under such circumstances, the receiver node sends a Request To Broadcast RTB to the sender node on condition that it is moving in the same direction as the transmitter node and is located ahead of the transmitter node relative to the direction of movement of the transmitter node.

During a verification step $E_{18}$, the transport node determines whether it has received any Request To Broadcast RTB sent by neighbor nodes in response to the data packet D broadcast by the transport node during the periodic broadcast step $E_{16}$.

If the transport node has received no Request To Broadcast at the end of a predetermined period, said node repeats the test step $E_{12}$, the broadcast step $E_{16}$ and where appropriate the update step $E_{14}$ already described, these steps being repeated for as long as the transport node does not receive any Request To Broadcast from a neighbor node. Thus the transport node stores the data packet D and broadcasts it at regular time intervals as it moves until it is received by at least one neighbor node.

The time interval between two successive broadcasts effected by a transport node is adjusted dynamically as a function of the speed of movement of that node.

When a transport node receives a Request To Broadcast from a neighbor node, it authorizes it to broadcast the data packet by sending it a Clear To Broadcast CTB.

If the transport node is serving as the source node (H=1) and receiving Request To Broadcast messages RTB, it sends (step $E_{20}$) a Clear To Broadcast CTB to the first two nodes that sent a Request To Broadcast RTB moving in opposite directions. Accordingly, the transport node acquiring the new source node status enables the election of two propagation nodes of the invention. The data packet is then broadcast simultaneously in the respective movement directions of each new propagation node in the direction propagation step $E_5$ described above.

If the transport node is acting at the propagation node (H=2) and receives a Request To Broadcast RTB, it sends (step $E_{22}$) a Clear To Broadcast CTB to the node that sent a Request To Broadcast RTB.

Accordingly, the transport node $T_1$ having acquired the new propagation node status is a peripheral node $B_1$ (not represented in FIG. 8) that has been detached from the group G of nodes (not represented in FIG. 8) to which it belongs and that is moving in the direction of another group $G_1$ of nodes along a traffic lane. Not being attached to any group, the peripheral node $B_1$ becomes a transport node $T_1$ during the initial step $E_{10}$ of the intergroup broadcasting phase $P_2$.

During the test phase $E_{12}$, the transport $T_1$ does not detect any change in its direction of movement. Consequently, it broadcasts the data packet D with the variable H=2 during the broadcast step $E_{16}$.

The transport node $T_1$ repeats test step $E_{12}$, broadcast step $E_{16}$ and where appropriate step $E_{14}$ until it reaches a group of nodes $G_1$ that it integrates. As shown in FIG. 8, it is assumed by way of example that the transport node $T_1$ effects three successive broadcasts (illustrated by the concentric dashed-line circles in FIG. 8) while it is moving until it transmits the data packet to neighbor nodes 40, 41, 42, 47, 48 that belong to the group $G_1$.

On reception of the data packet D, the neighbor nodes 40, 41, 47, 48 obtain from the received data packet D the value of the variable H=2 and the direction of movement of the transport node $T_1$.

Only the nodes 40, 41, 42 that are moving in the same direction as the transport node $T_1$ and are located ahead of it generate a Request To Broadcast RTB. In this example, the node 42 is the first node to send a Request To Broadcast RTB to the transport node $T_1$ given that it is the one farthest from the transport node $T_1$ (although within its range).

During the step $E_{22}$, the transport node $T_1$ sends a Clear To Broadcast CTB to the node 42 that has been elected relay node.

The data packet D is then broadcast within the group $G_1$ until the packet is received by a peripheral node 44 of the group $G_1$ in the directional propagation step $E_5$ described above.

Figure 9:
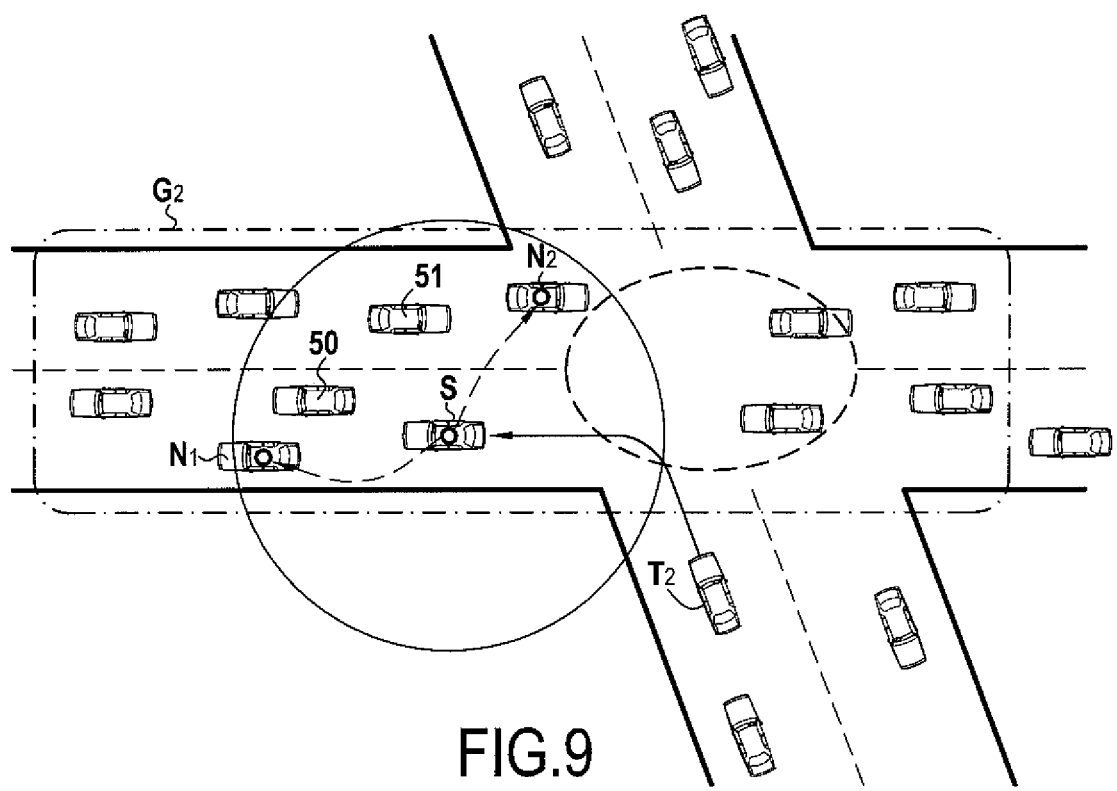
FIG. 9 illustrates diagrammatically a second example of a scenario according to the present invention in which a peripheral node transmits the data packet to another group of nodes during an intergroup broadcasting step.
Figure 10:
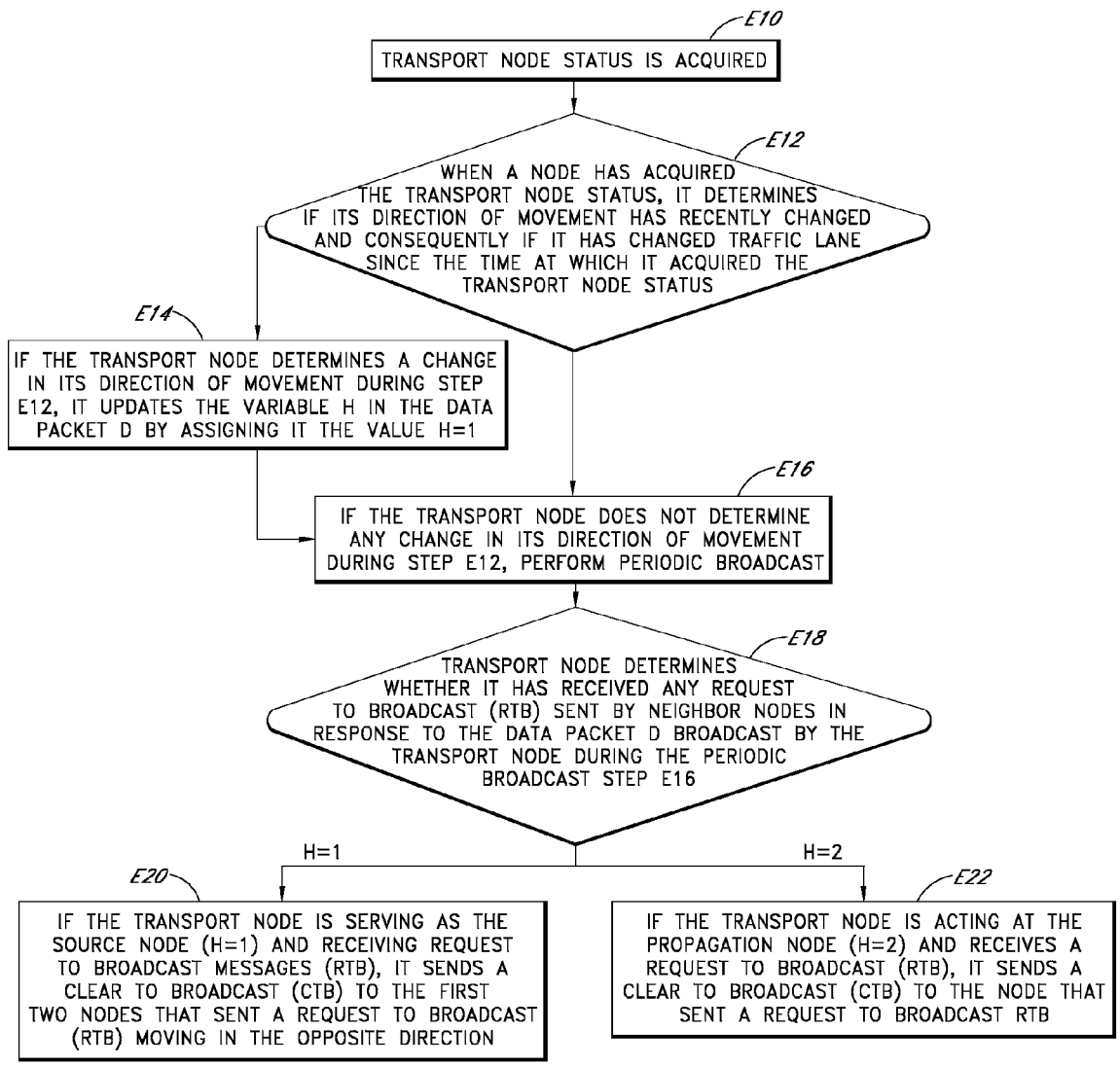
FIG. 10 shows in flowchart form the steps of the method of the invention executed during the intergroup broadcasting phase.

According to the scenario illustrated by FIG. 9, a transport node $T_2$ integrates a group $G_2$ following a change of direction, in which group it is integrated by way of source node S.

During the test step $E_{12}$, the transport node $T_2$ determines that its direction of movement has changed following a change of traffic lane.

During the update step $E_{14}$, the transport node $T_2$ updates the variable H in the data packet D to the value 1 (H=1) indicating that from now on it is the source node S.

The transport node $T_2$ that is now the source node S broadcasts the data packet D during the broadcast step $E_{16}$.

On reception of the data packet D, the neighbor nodes $N_1$, $N_2$, 50, 51 of the source node S obtain from the received data packet D the value of the variable H=1 and the direction of movement of the transport node $T_2$.

For the direction of movement of the source node S, the neighbor node $N_1$ is elected propagation node given that it is the farthest ahead of the source node S. For the direction of movement opposite that of the source node S, the neighbor node $N_2$ is elected propagation node given that it is the farthest behind the source node S.

The two propagation nodes $N_1$ and $N_2$ are elected in the election step $E_4$ already described. The nodes $N_1$ and $N_2$ are the first two nodes to send a Request To Broadcast to the source node S which in response sends them a Clear To Broadcast.

The data packet is then propagated simultaneously in the movement direction of each propagation node in the directional propagation step $E_5$ already described, until it reaches the periphery of the group $G_2$ during the step $E_6$ already described.

The above example relates to the situation in which a peripheral node is detached from a group in order to integrate another. Alternatively, the situation may be considered in which the peripheral node remains attached to the group until the group is merged with another group. In this situation, during the periodic broadcast step $E_{12}$ the peripheral node broadcasts the data packet at regular time intervals while it is moving until the data packet is received by mobile nodes of the other group. Accordingly, the peripheral node plays the role of a transport node that broadcasts the packet until the two groups are merged.

It should be noted that the onboard navigation device in each mobile node includes software processing means adapted to execute autonomously and in a decentralized manner the steps and substeps relating to the election of a propagation node or a relay node as described above during the intragroup broadcast phase $P_1$ and the steps relating to the intergroup broadcast phase $P_2$.

In particular, equation 1 for determining the waiting time of each candidate node for election is programmed and saved in a memory of the onboard navigation device.

The wireless communications terminal of each mobile node includes transmit and receive means enabling each node to broadcast and to receive data packets, Requests To Broadcast and broadcast commands (Clear To Broadcast).

The invention claimed is:

1. A method of broadcasting at least one data packet in a network including a set of groups of mobile nodes, said method including an intragroup broadcast phase during which said at least one data packet is broadcast to the mobile nodes of the same group, said intragroup broadcast phase including an initial broadcast during which a source node broadcasts said at least one data packet to a set of neighbor nodes wherein said intragroup broadcast phase further includes electing two propagation nodes moving in opposite directions away from each other during which a first neighbor node of said source node is elected as a first propagation node on condition that it is located ahead of the source node relative to the direction of movement of the source node and is moving in the same direction as the source node and during which a second neighbor node of said source node is elected as a second propagation node on condition that it is located behind the source node relative to the direction of movement of the source node and is moving in the direction opposite to the direction of movement of said source node.

2. The method according to claim 1, wherein said intragroup broadcast phase further includes a directional propagation during which each elected propagation node transmits the at least one data packet to a relay node moving in the same direction as the propagation node and located downstream of said propagation node relative to the direction of movement of the propagation node.

3. The method according to claim 2, wherein the directional propagation further includes at least:
 a broadcast phase during which a current relay node broadcasts the at least one data packet to its neighbor nodes; and
 an election during which a next relay node moving in the same direction as the current relay node and located downstream of said current relay node relative to the direction of movement of the current relay node is elected from among the neighbor nodes of said current relay node, said broadcast phase and said election being repeated until an elected node is a peripheral node of said group.

4. The method according to claim 1, further including an intergroup broadcast phase during which the at least one data packet is transmitted to another group of nodes via a transport node broadcasting the at least one data packet while it is moving at regular time intervals during a periodic broadcast until said transport node receives at least one Request To Broadcast in respect of said packet sent by at least one of the propagation nodes.

5. The method according to claim 4, wherein the regular time interval between two successive iterations of the periodic broadcast is determined by the transport node as a function of its speed of movement.

6. The method according to claim 4, wherein the intergroup broadcast phase further includes:
 a test during which said transport node determines whether its direction of movement has changed since the last broadcasting of the at least one packet by said node; and
 if not, the transport node acquires propagation node status and sends a Clear To Broadcast in respect of said packet to a neighbor node in response to a Request To Broadcast sent by said neighbor node;
 if so, the transport node acquires source node status and sends a Clear To Broadcast in respect of said packet to two neighbor nodes in response to a Request To Broadcast sent by the neighbor nodes.

7. A system for broadcasting at least one data packet including a set of groups of mobile nodes forming a network, wherein a group of nodes includes:
 a source node broadcasting said at least one data packet to a set of neighbor nodes within said group of nodes; and
 two propagation nodes moving in opposite directions away from each other, a first neighbor node of said source node being elected as a first propagation node on condition that it is located ahead of the source node relative to the direction of movement of the source node and is moving in the same direction as the source node and a second neighbor node of said source node being elected as a second propagation node on condition that it is located behind the source node relative to the direction of movement of the source node and is moving in the direction opposite the direction of movement of said source node, each propagation node broadcasting the at least one data packet.

8. The system according to claim 7, wherein the group of nodes further includes:
 at least one relay node moving in the same direction as one of said propagation nodes and located downstream of said propagation node relative to the direction of movement of the propagation node; and
 at least one transport node located at the periphery of the group of nodes, configured to receive said at least one data packet from one of said propagation nodes or from one of said at least one relay nodes and to transmit the at least one data packet to another group of nodes of said system.

9. A network for broadcasting at least one data packet, said network including a set of groups of mobile nodes, said network being programmed to perform an intragroup broadcast phase during which said at least one data packet is broadcast to the mobile nodes of the same group, said intragroup broadcast phase including an initial broadcast during which a source node broadcasts said at least one data packet to a set of neighbor nodes wherein said intragroup broadcast phase further includes electing two propagation nodes moving in opposite directions away from each other during which a first neighbor node of said source node is elected as a first propagation node on condition that it is located ahead of the source node relative to the direction of movement of the source node and is moving in the same direction as the source node and during which a second neighbor node of said source node is elected as a second propagation node on condition that it is located behind the source node relative to the direction of movement of the source node and is moving in the direction opposite to the direction of movement of said source node.

* * * * *

UNITED STATES PATENT AND TRADEMARK OFFICE
CERTIFICATE OF CORRECTION

PATENT NO. : 8,526,444 B2
APPLICATION NO. : 12/743328
DATED : September 3, 2013
INVENTOR(S) : Jerbi et al.

Page 1 of 1

It is certified that error appears in the above-identified patent and that said Letters Patent is hereby corrected as shown below:

Title Page (item 54, Title) and in the Specification, column 1, at lines 1-3, Change "METHOD FOR DISTRIBUTING DATA PACKETS IN A MOBILE NODE NETWORK AND ASSOCIATED NODE" to --A METHOD OF BROADCASTING DATA PACKETS IN A NETWORK OF MOBILE NODES AND AN ASSOCIATED NODE--.

In the Drawings:

Sheet 6 of 13 (Reference Numeral E412, FIG. 5B) at line 3, Change "BRODCAST" to --BROADCAST--.

Figure 7A:
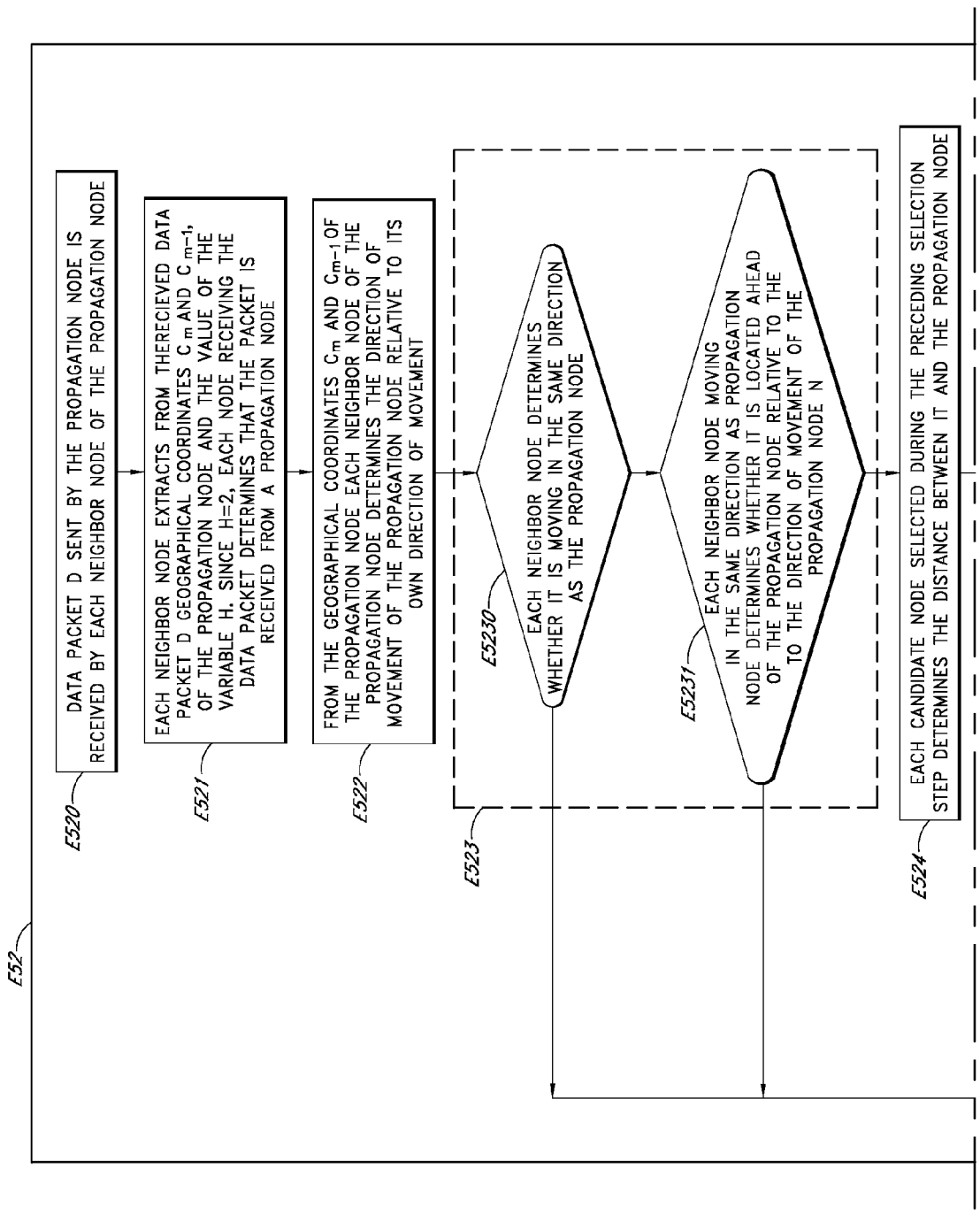
Figure 7B:
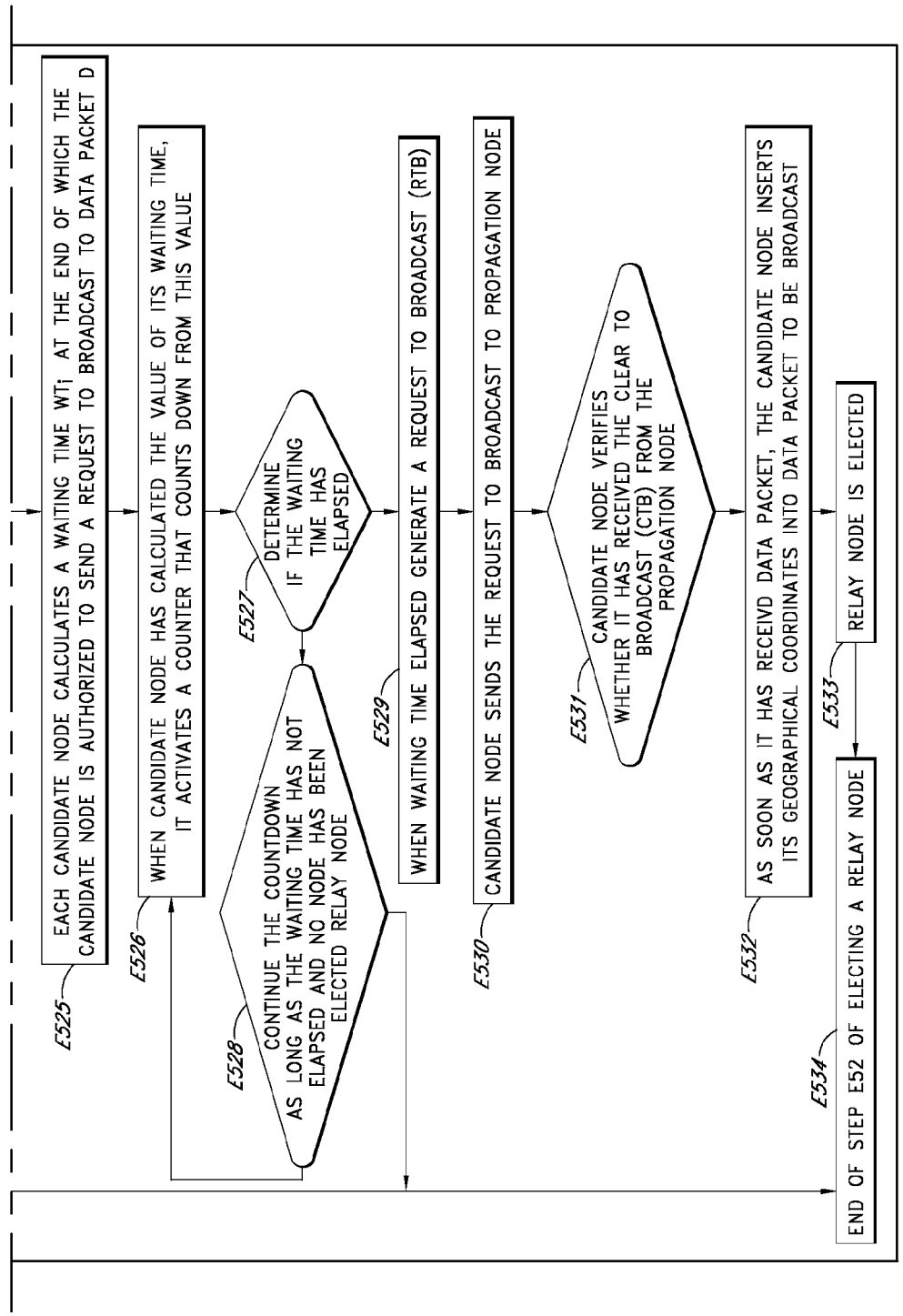

Sheet 9 of 13 (Reference Numeral E521, FIG. 7A) at line 1, Change "THERECIEVED" to --THE RECEIVED--.

Sheet 10 of 13 (Reference Numeral E532) at line 1, Change "RECEIVD" to --RECEIVED--.

In the Specification:

In column 9 at line 2, Change "$WT_1=Wr_{Max}(1-d_1/R)<WT_6=WT_{Max}(1-d_6/R).$" to --$WT_1=WT_{Max}(1-d_1/R)<WT_6=WT_{Max}(1-d_6/R).$--.

In column 10 at line 57-58, Change "$WT_{11}=WT_{Max}(1-d_{11}/R)-WT_{21}=WT_{Max}(1-d_{21}/R).$" to --$WT_{11}=WT_{Max}(1-d_{11}/R)<WT_{21}=WT_{Max}(1-d_{21}/R).$--.

Signed and Sealed this
Twenty-seventh Day of May, 2014

Michelle K. Lee
*Deputy Director of the United States Patent and Trademark Office*